United States Patent Office.

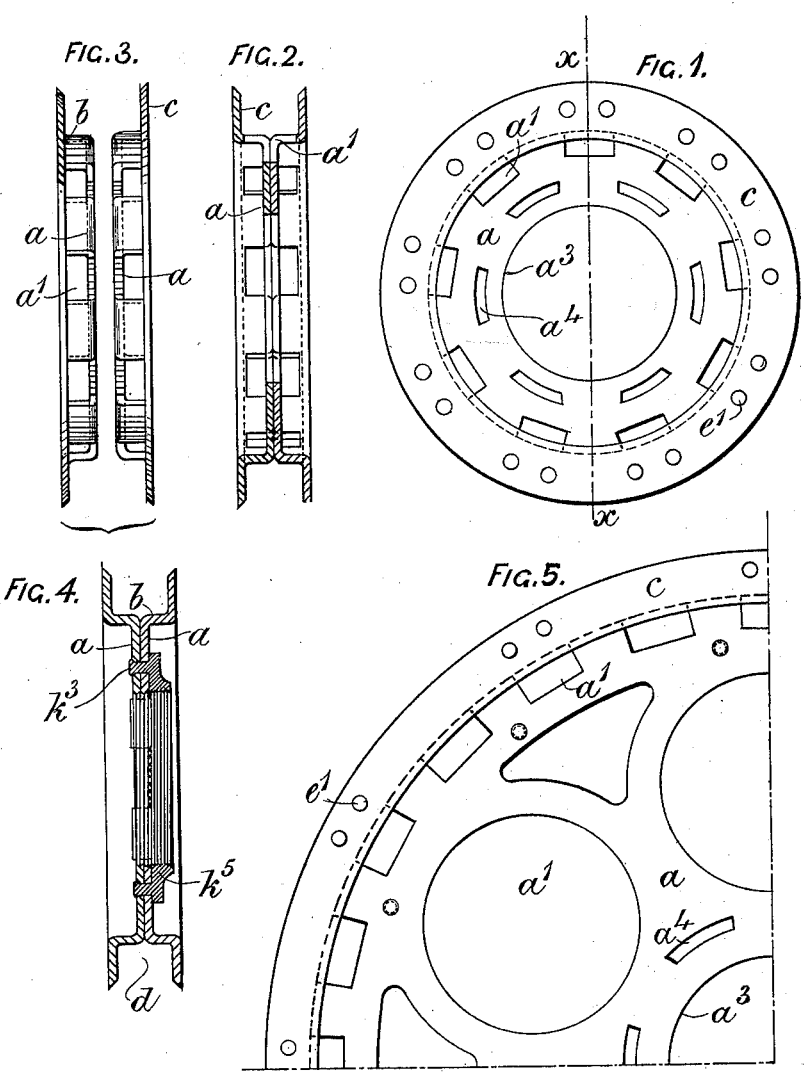

THOMAS HEWETT, OF LONDON, ENGLAND, ASSIGNOR OF ONE-HALF TO THOMAS KERRISON BELLIS, OF SAME PLACE.

WHEEL FOR CHAIN-GEARING.

SPECIFICATION forming part of Letters Patent No. 609,346, dated August 16, 1898.

Application filed February 10, 1898. Serial No. 669,821. (No model.)

*To all whom it may concern:*

Be it known that I, THOMAS HEWETT, mechanical engineer, a subject of the Queen of Great Britain, residing at 6 Jeffrey's Square, St. Mary Axe, in the city of London, England, have invented certain new and useful Improvements in Wheels for Chain-Gearing, (for which I obtained Letters Patent in Great Britain on the 23d day of July, 1897, numbered 17,379,) of which the following is a specification.

This invention relates to an improved construction of wheels for chain-gearing, such gearing being applicable as the driving-gear of bicycles and other velocipedes and for a variety of other or analogous uses.

My improved chain-wheel I construct of two metal disks suitably shaped and secured fixedly together for the purpose of carrying series of antifriction-rolls to be engaged by the driving-chain, as will be hereinafter fully described, reference being had to the accompanying drawings.

In the drawings, Figure 1 shows a side view of a gear-wheel according to the present improvements. Fig. 2 shows a sectional view of the same, taken on the line $x\ x$ of Fig. 1. Fig. 3 shows an edge view of the two half parts of the wheel shown in Figs. 1 and 2, said half parts being afterward connected to form a wheel. Fig. 4 shows a sectional view of such wheels, showing the method of fastening the two halves together; and Fig. 5 shows a side view of a portion of the larger or driving wheel, the smaller or driven wheel being shown in Fig. 1.

My improved chain-wheel I construct of two metal disks $a\ a$, each disk being stamped or formed near its periphery with a shoulder $b$ and then a radial extension $c$ or flange, so that when the two disks are brought side by side and secured fixedly together a wheel is formed with a recess or trough-like annular channel $d$, in which the drive-chain may lie. The disks $a\ a$ are for lightness and other reasons formed with openings $a'\ a'$. Some of these openings are arranged to come oppositely disposed in each disk, these openings forming a series of clear spaces in the peripheral channel-bed $d$ for the escape of mud. These parts may be accurately produced by the aid of suitable dies and presses.

The disk portion $a$ of the wheel is provided with openings $a^4$, which receive corresponding projections $k^5$ (see Fig. 4) from a ring $k^5$, said projections being riveted over at their outer ends to firmly hold the two halves of the wheel together. The collar $k^5$ is interiorly threaded and serves as a means whereby to attach the wheel to the driven axis. The interiorly-threaded portion of the collar $k^5$ registers with the edges of the central apertures $a^3$ of the disks, which are interiorly threaded also, the threads of said central apertures corresponding with the threads of the collar and forming a continuation thereof.

Having now particularly described and ascertained the nature of my said invention and in what manner the same is to be performed, I declare that what I claim is—

1. In a wheel for chain-gearing, the combination with two centrally-apertured disks having parallel radial flanges on their peripheries forming a circumferential groove for the reception of a sprocket-chain, said disks being provided with a plurality of registering slots, of an interiorly-threaded collar provided on its inner face with integral projections extending through the slots in the disks and headed down at their outer ends to firmly bind the disks together, substantially as described.

2. In a wheel for chain-gearing, the combination with two centrally-apertured disks having parallel radial flanges on their peripheries forming a circumferential groove for the reception of a sprocket-chain, said disks being provided with a plurality of registering slots, of an interiorly-threaded collar provided on its inner face with integral projections extending through the slots in the disks and headed down at their outer ends to firmly bind the disks together, the edges of the said central apertures in the disks being threaded and forming a continuation of the threads of the collar, substantially as described.

In testimony whereof I have hereunto set my hand in presence of two subscribing witnesses.

THOMAS HEWETT.

Witnesses:
  ALFRED GEORGE BROOKES,
  ERNEST JOHN HILL.